United States Patent
Shim et al.

(10) Patent No.: US 10,133,389 B2
(45) Date of Patent: Nov. 20, 2018

(54) WATCH TYPE MOBILE TERMINAL AND METHOD FOR CONTROLLING THE SAME

(71) Applicant: LG ELECTRONICS INC., Seoul (KR)

(72) Inventors: Hongjo Shim, Seoul (KR); Hyunwoo Kim, Seoul (KR); Myungwon Kim, Seoul (KR); Youngmo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 15/403,133

(22) Filed: Jan. 10, 2017

(65) Prior Publication Data

US 2018/0024684 A1    Jan. 25, 2018

(30) Foreign Application Priority Data

Jul. 22, 2016    (KR) ........................ 10-2016-0093639

(51) Int. Cl.
    G06F 1/16            (2006.01)
    G06F 3/041          (2006.01)
    (Continued)

(52) U.S. Cl.
    CPC ........ G06F 3/0414 (2013.01); A63B 24/0062 (2013.01); A63B 71/0622 (2013.01);
    (Continued)

(58) Field of Classification Search
    CPC .................. G06F 3/0414; G06F 3/044; G06F 2203/04101; G06F 1/163; A63B 71/0622;
    (Continued)

(56) References Cited

U.S. PATENT DOCUMENTS

2007/0244399 A1* 10/2007 Kim .................... A61B 5/02416
                                                                       600/502
2012/0306643 A1    12/2012   Dugan
                      (Continued)

FOREIGN PATENT DOCUMENTS

JP              4438629          3/2010
KR    1020090029561       3/2009
                (Continued)

OTHER PUBLICATIONS

PCT International Application No. PCT/KR2016/014690, Notification of Transmittal of the International Search Report and the Written Opinion of the International Searching Authority, or Declaration dated Apr. 20, 2017, 8 pages.

*Primary Examiner* — Joseph Haley
*Assistant Examiner* — Chineyere Wills-Burns
(74) *Attorney, Agent, or Firm* — Lee Hong Degerman Kang & Waimey

(57) ABSTRACT

The present invention relates to a mobile terminal capable of performing a pressure measurement, the mobile terminal including a pressure sensor, a main body having an inner space to accommodate the pressure sensor therein, a cover configured to cover at least part of the main body, and a hole formed through the cover to allow an introduction of external air into the inner space, and located to face the pressure sensor.

9 Claims, 18 Drawing Sheets

(51) Int. Cl.
*A63B 24/00* (2006.01)
*A63B 71/06* (2006.01)
*G06F 3/044* (2006.01)

(52) U.S. Cl.
CPC .......... *G06F 1/1684* (2013.01); *G06F 1/1694* (2013.01); *G06F 3/044* (2013.01); *A63B 2024/0071* (2013.01); *A63B 2071/0625* (2013.01); *A63B 2071/0655* (2013.01); *A63B 2071/0663* (2013.01); *A63B 2220/40* (2013.01); *A63B 2220/56* (2013.01); *A63B 2220/58* (2013.01); *A63B 2220/803* (2013.01); *A63B 2220/805* (2013.01); *A63B 2220/806* (2013.01); *A63B 2220/807* (2013.01); *A63B 2220/808* (2013.01); *A63B 2225/50* (2013.01); *A63B 2230/045* (2013.01); *A63B 2230/08* (2013.01); *A63B 2230/50* (2013.01); *G06F 2203/04101* (2013.01)

(58) Field of Classification Search
CPC .......... A63B 24/0062; A63B 2230/045; A63B 2230/50; A63B 2220/808; A63B 2220/58; A63B 2220/40; A63B 2225/50; A63B 2071/0663; A63B 2220/805; A63B 2220/807

USPC ........................................................ 345/174
See application file for complete search history.

(56) References Cited

U.S. PATENT DOCUMENTS

| | | | |
|---|---|---|---|
| 2013/0060167 A1* | 3/2013 | Dracup | A61B 5/11 600/595 |
| 2013/0150736 A1* | 6/2013 | Romano | A61B 5/02108 600/485 |
| 2014/0266939 A1* | 9/2014 | Baringer | H01Q 21/28 343/729 |
| 2016/0058367 A1* | 3/2016 | Raghuram | A61B 5/486 600/479 |
| 2016/0206215 A1* | 7/2016 | Takahashi | A61B 5/681 |
| 2016/0220180 A1* | 8/2016 | Fateh | A61J 7/0427 |

FOREIGN PATENT DOCUMENTS

KR 1020150007587 1/2015
WO 2014157945 10/2014

* cited by examiner (a)

(b)

(c)

[ FIRST FILTER ]

[ THIRD FILTER ]

[ FIFTH FILTER ]

WATCH TYPE MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2016-0093639, filed on Jul. 22, 2016, the contents of which are all hereby incorporated by reference herein in its entirety.

BACKGROUND OF THE INVENTION

1. Field of the Invention

This specification relates to a watch type mobile terminal capable of measuring pressure, and a method for controlling the same.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

In recent time, terminals are being developed as wearable devices which are wearable on users' bodies. The wearable devices can provide various functions associated with users' body conditions by utilizing a direct contact or proximity contact with the users' bodies.

As one of such wearable devices, a watch type mobile terminal worn on a user's wrist has been developed. The watch type mobile terminal can determine the user's motion more accurately, owing to being worn on the user's wrist.

Meanwhile, the watch type mobile terminal can detect a stair climbing exercise to provide the user with health-related information such as calorie consumption and the like. However, during the stair climbing exercise, accuracy of pressure measurement is lowered due to the user's motion.

SUMMARY OF THE INVENTION

Therefore, an aspect of the detailed description is to provide a structure capable of improving accuracy of pressure measurement of a watch type mobile terminal.

Another aspect of the detailed description is to provide an adaptive filter capable of improving accuracy of pressure measurement of a watch type mobile terminal.

To achieve these and other advantages and in accordance with the purpose of this specification, as embodied and broadly described herein, there is provided a watch type mobile terminal, including a pressure sensor, a main body having an inner space to accommodate the pressure sensor therein, a cover configured to cover at least part of the main body, and a hole formed through the cover to allow an introduction of external air into the inner space, and located to face the pressure sensor.

In one embodiment disclosed herein, the hole may be located above an arranged position of the pressure sensor such that the external air directly reaches the pressure sensor.

In one embodiment disclosed herein, the mobile terminal may further include a supporting member disposed between the cover and the pressure sensor to prevent a pressure variation due to deformation of the cover.

In one embodiment disclosed herein, the supporting member may include a hollow area through which external air introduced through the hole flows.

In one embodiment disclosed herein, the mobile terminal may further include a waterproofing member disposed between the hole and the pressure sensor to prevent an introduction of water into the inner space.

In one embodiment disclosed herein, the hole may form an air layer between the cover and the pressure sensor.

In one embodiment disclosed herein, the mobile terminal may further include a heat-dissipation member surrounding the pressure sensor such that heat generated in the inner space is not detected by the pressure sensor.

In one embodiment disclosed herein, a case may be configured to cover a side surface of the main body, and the hole may be bent toward the pressure sensor, starting from the side surface of the main body.

A watch type mobile terminal capable of executing pressure measurement, according to another embodiment of the present invention may include a main body, a motion sensor configured to detect a motion of the main body, a photoplethymography (PPG) sensor disposed on a rear surface of the main body and configured to detect a heart rate, a pressure sensor configured to detect pressure of external air, and a controller configured to compensate for a pressure value detected by the pressure sensor on the basis of a measurement value obtained by the PPG sensor when the motion of the main body is detected.

In one embodiment disclosed herein, the controller may determine an exercise type of the main body based on motion information detected by the motion sensor. The controller may compensate for the pressure based on the measurement value obtained by the PPG sensor when the exercise type of the main body corresponds to a specific type.

In one embodiment disclosed herein, the controller may not compensate for the pressure value when the exercise type of the main body does not correspond to the specific type.

In one embodiment disclosed herein, the exercise type of the main body may include a walking exercise, a running exercise, a bicycling exercise and a vehicle-driving exercise.

In one embodiment disclosed herein, the controller may decide an order of a low pass filter for compensating for the pressure value on the basis of a variation of the measurement value obtained by the PPG sensor.

In one embodiment disclosed herein, the controller may set a high order for the low pass filter for compensating for the pressure value when the variation of the measurement value obtained by the PPG sensor is great. The controller may set a low order for the low pass filter for compensating for the pressure value when the variation of the measurement value obtained by the PPG sensor is small.

In one embodiment disclosed herein, the controller may compensate for the pressure value using a low pass filter having an order set based on the variation of the measurement value obtained by the PPG sensor.

In one embodiment disclosed herein, the PPG sensor may be disposed on a rear surface of the main body and always operate, irrespective of a user setting.

In one embodiment disclosed herein, the controller may decide an activation or deactivation of the pressure sensor based on motion information detected by the motion sensor.

In one embodiment disclosed herein, the controller may deactivate the pressure sensor when the motion of the main body is not detected based on the motion information, and activate the pressure sensor when the motion of the main body is detected based on the motion information.

In one embodiment disclosed herein, the controller may not execute the compensation for the pressure value when it is determined that the main body does not move any more.

In one embodiment disclosed herein, the controller may not apply a low pass filter to the pressure value.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
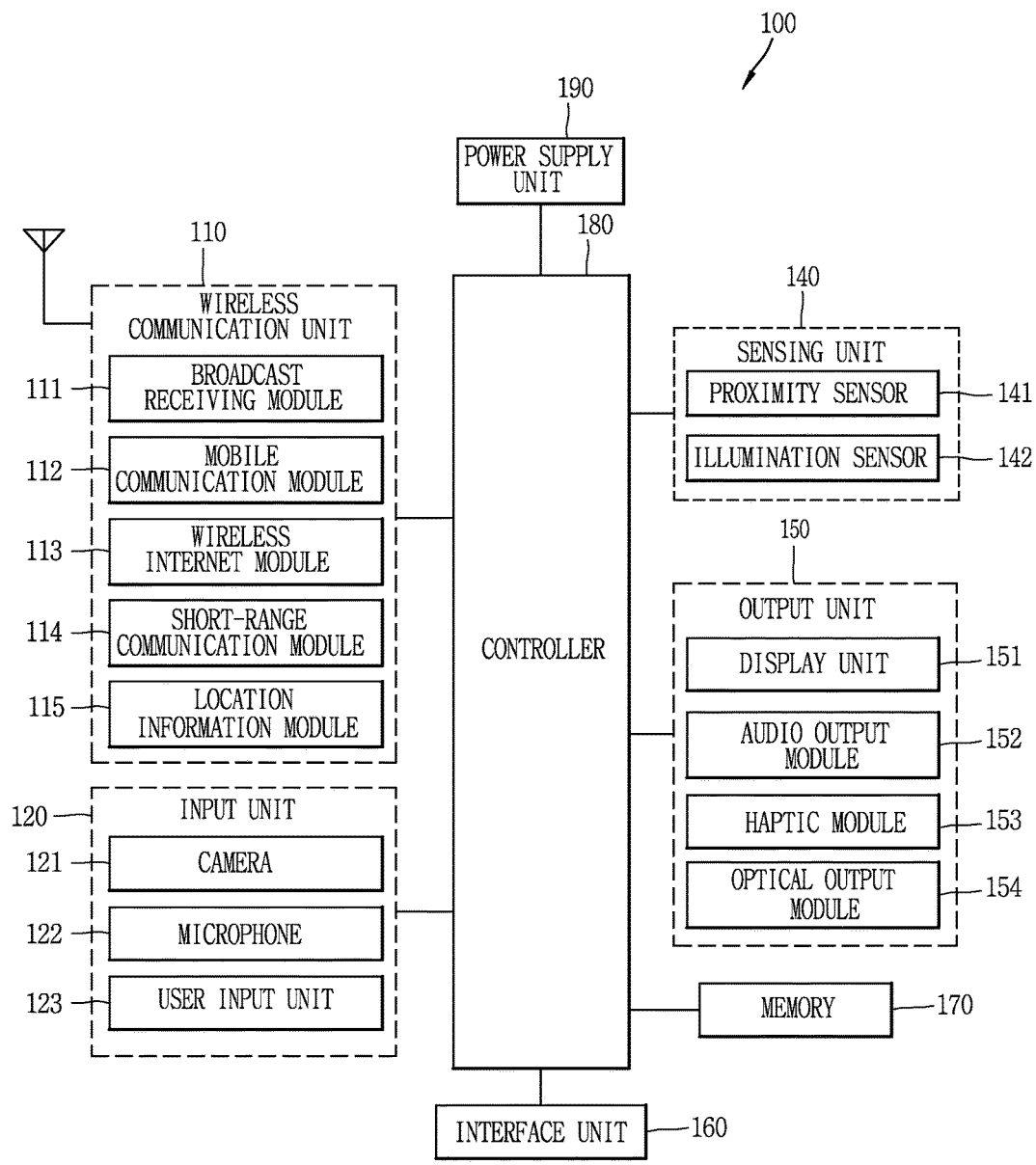
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1B:
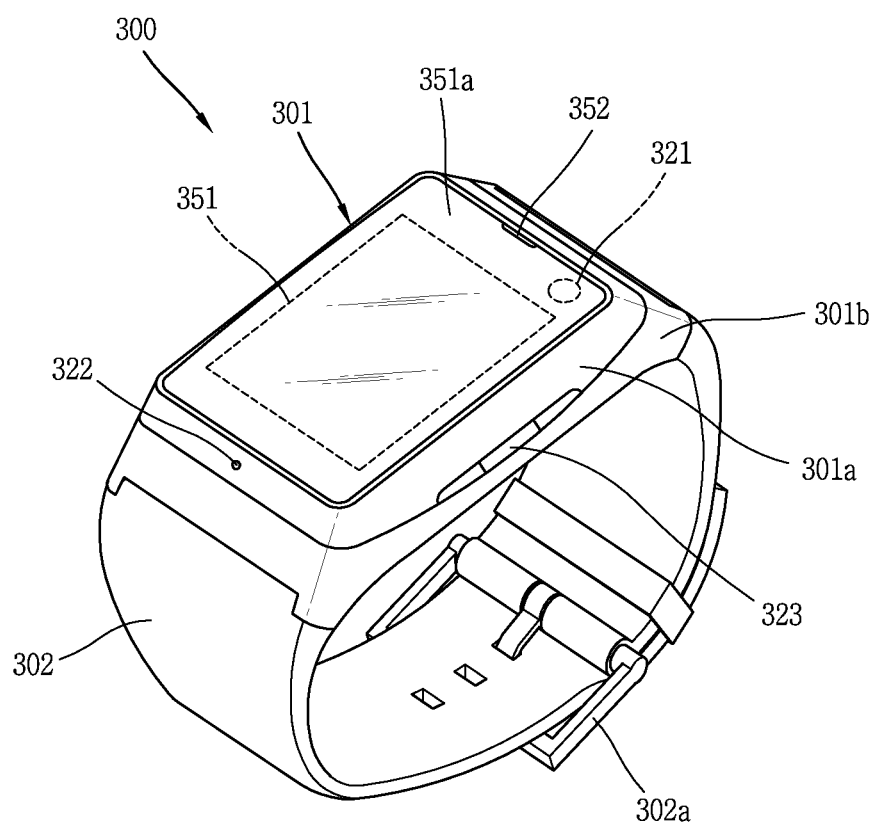
FIG. 1B is a perspective view of a watch type mobile terminal 300 in accordance with another embodiment of the present invention.

Referring to FIGS. 1A and 1B, FIG. 1A is a block diagram of a mobile terminal in accordance with the present disclosure, and FIG. 1B is a perspective view of a watch type mobile terminal 300 in accordance with another embodiment of the present invention.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Meanwhile, a mobile terminal may extend to a wearable device which is wearable on a human body. Such devices go beyond the usual technique of a user grasping the mobile terminal using his hand. Examples of the wearable device include a smart watch, a smart glass, a head mounted display (HMD), and the like. Hereinafter, examples of the mobile terminals extended to the wearable devices will be described.

The wearable device is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

FIG. 1B is a perspective view of a watch type mobile terminal 300 in accordance with another embodiment of the present invention.

Referring to FIG. 1B, a watch type mobile terminal 300 includes a main body 301 with a display unit 351, and a band 302 connected to the main body 301 to be wearable on a wrist. In general, mobile terminal 300 may be configured to include features that are the same or similar to those of the mobile terminal 100 of FIG. 1A.

The main body 301 may include a case having a certain appearance. As illustrated, the case may include a first case 301a and a second case 301b cooperatively defining an inner space for accommodating various electronic components. Various electronic components are disposed in the inner space.

Also, at least one middle case may additionally be interposed between the first case 301a and the second case 301b.

The display unit 351 may be disposed on a front surface of the main body 301 to output information thereon. The display unit 351 may be provided with a touch sensor so as to be implemented as a touch screen. As illustrated, a window 351a of the display unit 351 may be mounted on the first case 301a to define the front surface of the terminal body together with the first case 301a.

In some cases, electronic components may also be attached on the second case 301b. The electronic components attachable on the second case 301b may be a detachable battery, an identification module, a memory card, a PPG sensor and the like. In this instance, a rear cover 301c for covering the attached electronic components may be coupled to the second case 301b in a detachable manner. Therefore, when the rear cover 301c is detached from the second case 301b, the electronic components attached on the second case 301b are exposed to outside.

Also, the user can replace the electronic components attached on the second case 301b by detaching the rear cover 301c from the second case 301b.

As illustrated, when the rear cover 301c is coupled to the second case 301b, a side surface of the second case 301b may partially be exposed. In some cases, upon the coupling, the second case 301b may completely be obscured by the rear cover 301c. Meanwhile, the rear cover 301c may be provided with an opening through which the camera 121b or the audio output module 152b is externally exposed.

Meanwhile, the rear cover 301c may have a thickness less than a preset size or value to maintain appropriate strength of a measurement signal of the PPG sensor. For example, the rear cover 301c may be designed as thin as 0.5 mm or less. Accordingly, the rear cover 301c may be deformed in shape, such as being bent or curved by external force.

Those cases 301a, 301b and 301c may be formed by injection-molding synthetic resin or may be formed of a metal, for example, stainless steel (STS), aluminum (Al), titanium (Ti), or the like.

As an alternative to the example in which the plurality of cases form an inner space for accommodating electronic components, the mobile terminal 100 may be configured such that one case forms the inner space. In this example, a watch type mobile terminal 300 having a uni-body may be configured in such a manner that synthetic resin or metal extends from a side surface to a rear surface.

The watch type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The main body 301 may be provided with an audio output module 352, a camera 321, a microphone 322, a user input unit 323, a pressure sensor 343, a PPG sensor (not illustrated) and the like. The main body 301 may further include a motion sensor for detecting a motion of the main body. The motion sensor may be configured as various sensors such as an acceleration sensor, a gyro sensor and the like. Therefore, the motion sensor may measure motion-related information such as an acceleration value and the like.

When the display unit 351 is implemented as a touch screen, it may function as the user input unit 323, and a separate key may thus not be provided on the main body 301.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

Meanwhile, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Hereinafter, description will be given of a structure and method for measuring pressure using the watch type mobile terminal 300 illustrated in FIG. 1B.

Figure 2:
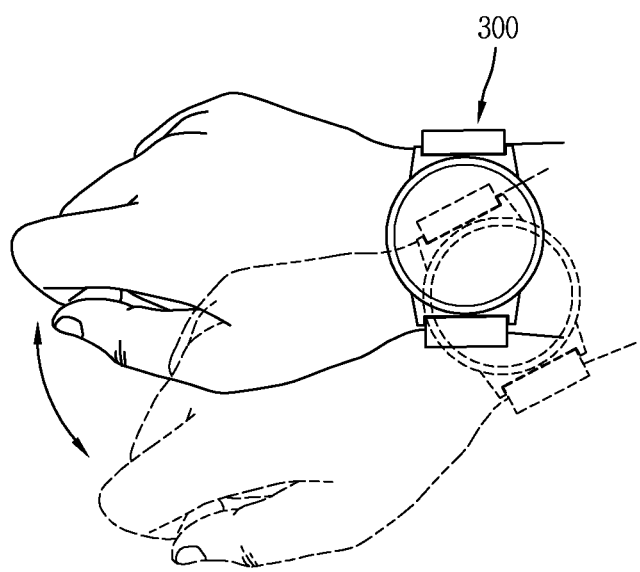
FIG. 2 is a conceptual view illustrating a state that the watch type mobile terminal 300 is worn on a part of a user's body.
Figure 3:
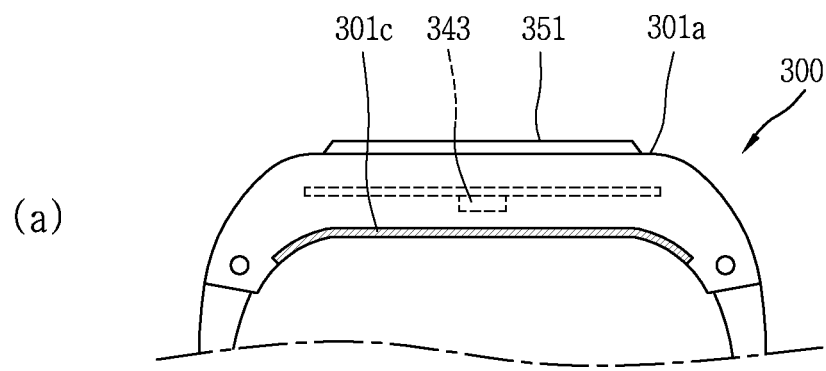
FIG. 3 is a conceptual view illustrating a state that a rear cover of the watch type mobile terminal 300 is moved in response to a motion of a user's body.
Figure 3:
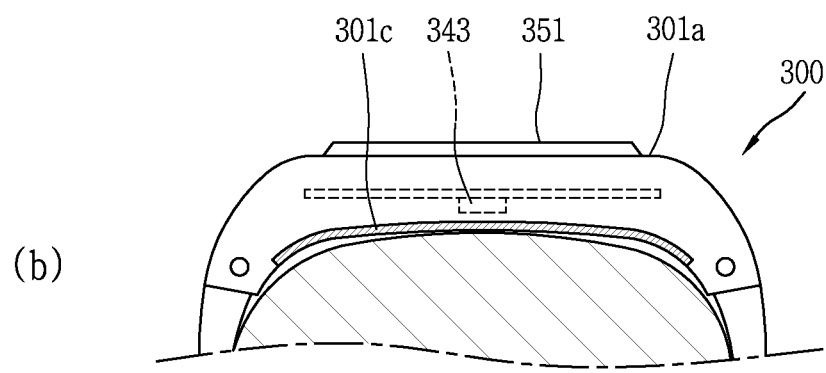
Figure 3:
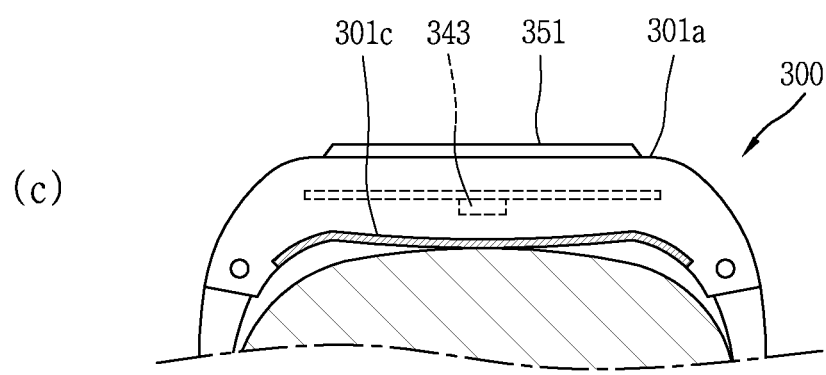
Figure 4:
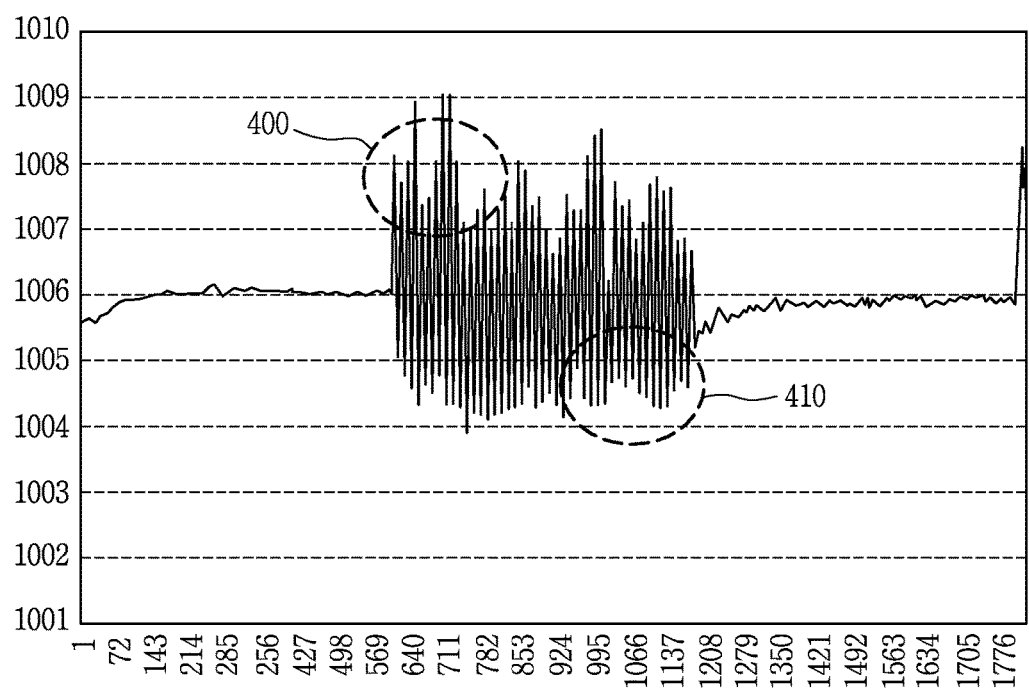
FIG. 4 is a graph showing variation of pressure measurement values of a pressure sensor due to the motion of the rear cover according to FIG. 3.

FIG. 2 is a conceptual view illustrating a state that the watch type mobile terminal 300 is worn on a part of a user's body, FIG. 3 is a conceptual view illustrating a state that a rear cover of the watch type mobile terminal 300 is moved in response to a motion of a user's body, and FIG. 4 is a graph showing a variation of (or a change in) pressure measurement values of a pressure sensor due to the motion of the rear cover according to FIG. 3.

The watch type mobile terminal 300 according to the present invention is configured to be wearable on a part of a user's body. For example, as illustrated in FIG. 2, the watch type mobile terminal 300 may be wearable on a wrist.

In this instance, when the watch type mobile terminal 300 is worn on the wrist, it may be moved in response to a movement of the wrist.

Also, the watch type mobile terminal 300 is deformed at an area which is brought into contact with or close to the wrist, resulting from the movement of the wrist. In more detail, when a rear surface of the main body 301 of the watch type terminal 300 is brought into contact with or moved close to the wrist, the rear cover 301c of the main body 301 may be deformed in shape, such as being bent or curved.

For example, as illustrated in (a) of FIG. 3, when external force is not applied to the rear cover 301c, the watch type mobile terminal 300 may be coupled to the second case 301b in a flat shape.

On the other hand, when external force is applied to the rear cover 301c due to a movement of the wrist, the watch type mobile terminal 300 may be deformed in shape. For example, the rear cover 301c, as illustrated in (b) of FIG. 3, may be curved toward the inner space due to the external force. As another example, the rear cover 301c, as illustrated in (c) of FIG. 3, may externally be curved due to restoring force of the rear cover 301c which is applied opposite to the external force.

In this instance, the inner space of the watch type mobile terminal 300 may change in volume due to the rear cover 301c being curved. Accordingly, the pressure sensor 343 disposed in the inner space, in more detail, the second case 301b may be affected, in view of pressure measurement, due to the volume change of the inner space.

FIG. 4 is a graph showing pressure measured by the pressure sensor of the watch type mobile terminal 300 according to the deformation of the rear cover 301c. Here, the pressure sensor may measure higher pressure 400 than pressure, which should be originally measured, when the rear cover 301c is curved toward the inner space as illustrated in (b) of FIG. 3. Similar to this, the pressure sensor may measure lower pressure 410 than pressure, which should be originally measured, when the rear cover 301c is curved to outside as illustrated in (c) of FIG. 3.

Accordingly, the watch type mobile terminal 300 may show lowered accuracy of the pressure measurement. Also, with regard to a health-related function, measurement errors increase upon calorie calculating, stair counting and the like, which are measured using the pressure value.

Therefore, a structure of compensating for the error of the pressure value in the watch type mobile terminal 300 is proposed in the present invention.

Figure 5A:
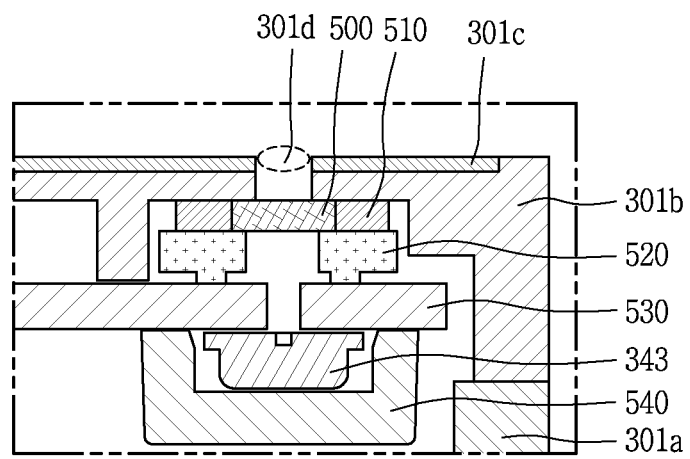
FIGS. 5A to 5C are structural views illustrating an arrangement structure of a pressure sensor of a watch type mobile terminal in accordance with one embodiment of the present invention.
Figure 5B:
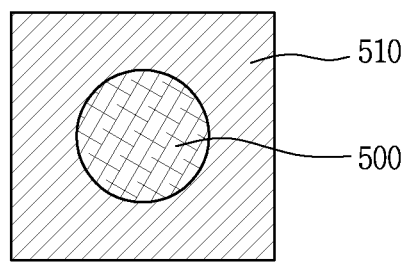
Figure 5C:
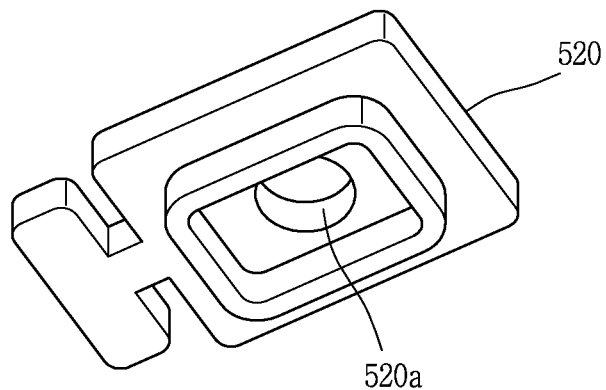
Figure 6:
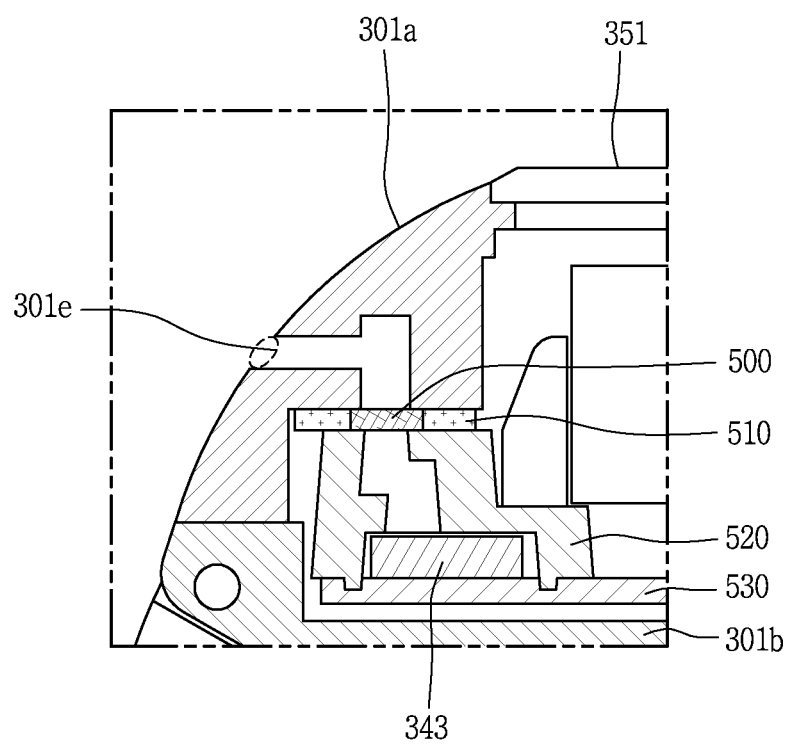
FIG. 6 is a structural view illustrating an arrangement structure of a pressure sensor of a watch type mobile terminal in accordance with another embodiment of the present invention.

FIGS. 5A to 5C are structural views illustrating an arrangement structure of a pressure sensor of a watch type mobile terminal in accordance with one embodiment of the present invention. Also, FIG. 6 is a structural view illustrating an arrangement structure of a pressure sensor of a watch type mobile terminal in accordance with another embodiment of the present invention.

In the watch type mobile terminal 300 according to the one embodiment of the present invention, a pressure sensor may be disposed directly beneath a hole for an introduction of external air therethrough, to prevent accuracy of pressure measurement by the pressure sensor from being lowered due to the deformation of the rear cover 301c.

As illustrated in FIG. 5A, a hole 301d may be formed through one area of the rear cover 301c of the main body 301. The hole 301d may allow external air to be introduced into the inner space of the watch type mobile terminal 300.

The hole 301d may be located at a position facing an arranged position of the pressure sensor 343 on the second case, such that the external air can directly reach the pressure sensor. Therefore, the pressure sensor 343 can directly detect the external air introduced through the hole 301d.

A waterproofing member 500 preventing introduction of water into the inner space may further be provided on a lower end of the hole 301d. The waterproofing member 500 may be made of a material which allows an introduction of the external air but prevent an introduction of water. For example, the waterproofing member 500 may be made of a Gore-tex material. Alternatively, in addition to the Gore-tex material, other materials having the same characteristic as the Gore-tex may also be used as the waterproofing member in the present invention.

The waterproofing member 500 may be disposed on the second case 301b. When the rear cover 301c is coupled to the second case 301b, the waterproofing member 500 may be disposed on a position where it overlaps the hole 301d. The waterproofing member 500, as illustrated in FIG. 5B, may be surrounded by a supporting member 510 that prevents a movement of the waterproofing member 500. The supporting member 510 may be made of a rubber material.

Or, unlike the example of FIG. 5A, the waterproofing member 500 may be disposed on the rear cover 301c. In this instance, the waterproofing member 500 may be disposed on an area where the rear cover 301c faces the second case 301b, and thus may not be externally exposed when the rear cover 301c is coupled to the second case 301b.

A supporting member 520 may be disposed on a lower end of the waterproofing member 500 to minimize a volume reduction of the inner space due to the movement of the rear cover 301c. The supporting member 520 may be interposed between the waterproofing member 500 and the pressure sensor 343 to prevent the pressure sensor 343 from being affected due to deformation of the waterproofing member 500 caused by the movement of the rear cover 301c.

The supporting member 520 may be made of a rubber material with elasticity. Therefore, the supporting member 520 may not affect the pressure sensor 343 even though the deformation is caused due to external force.

The supporting member 520 may include a hollow area at a position facing the position of the hole 301d and the waterproofing member 500, such that the external air introduced through the hole 301d and the waterproofing member 500 reaches the pressure sensor 343. That is, as illustrated in FIG. 5C, the supporting member 520 may include a hollow area 520a at a position facing the position of the hole 301d and the waterproofing member 500. The external air may be introduced through the hollow area 520a and reach the pressure sensor 343.

A printed circuit board (PCB) 530 may be disposed on a lower end of the supporting member 520. Also, the pressure sensor 343 may be disposed on a lower end of the PCB 530.

On one area of the PCB 530 may be formed a hole through which external air is introduced to reach the pressure sensor 343. The hole of the PCB 530 may be located at an area facing the hole 301d of the rear cover 301c.

Also, the pressure sensor 343 may be disposed beneath the hole of the PCB 530. That is, the pressure sensor 343 may be disposed on a position where the external air introduced through the hole 301d of the rear cover 301c can be directly detected.

The pressure sensor 343 may measure external pressure by detecting the external air introduced through the PCB 530. Therefore, the measurement accuracy of the pressure sensor 343 can be improved by virtue of the direct detection of the external air.

Or, unlike the example of FIG. 5A, the pressure sensor 343 may be disposed on the PCB 530. In this instance, any hole may not be formed on the PCB 530. Therefore, the pressure sensor 343 may be disposed on a lower end of the hollow area of the supporting member 520 so as to directly detect external air introduced through the supporting member 520.

Meanwhile, referring to FIG. 6, the watch type mobile terminal 300 according to another embodiment may include a hole 301e formed through the first case 301a such that external air can be introduced into the inner space therethrough.

In this instance, the hole 301e may have a shape of penetrating through the first case 301a and being bent toward the pressure sensor 343 located in the inner space. An air layer may be formed within the hole 301e and thus the pressure sensor 343 can detect pressure of the air layer.

As aforementioned, the waterproofing member 500 allowing the introduction of the external air and preventing the introduction of water may be disposed between the hole 301e and the pressure sensor 343.

Also, the pressure sensor 343 may be disposed between the supporting member 520 and the PCB 530. That is, the pressure sensor 343 may be located on the PCB. Therefore, the pressure sensor 343 can directly detect external air introduced through the hollow area of the supporting member 520. Other same/like components will be understood by the description of FIG. 5A.

Meanwhile, the pressure sensor 343 may be surrounded by a heat-dissipation member 540. The heat-dissipation member 540 may prevent heat generation such that the pressure sensor 343 cannot detect heat generated in the inner space. Therefore, the pressure sensor 343 can reduce a pressure error due to the heat generation.

The foregoing description has been given of the structure of the watch type mobile terminal 300 for improving the accuracy of the pressure sensor 343.

Meanwhile, the watch type mobile terminal 300 according to the present invention may further include a photoplethymography (PPG) sensor for detecting whether or not it is worn by the user and measuring a heart rate. Hereinafter, the PPG sensor will be described with reference to the accompanying drawings.

Figure 7A:
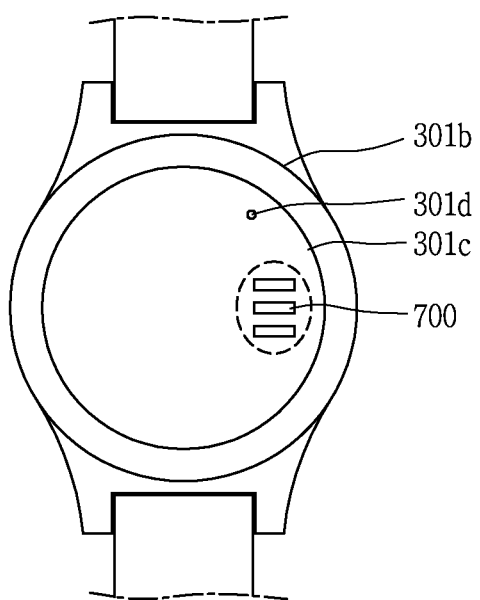
FIGS. 7A and 7B are views illustrating a PPG sensor provided in a watch type mobile terminal in accordance with the present invention.
Figure 7B:
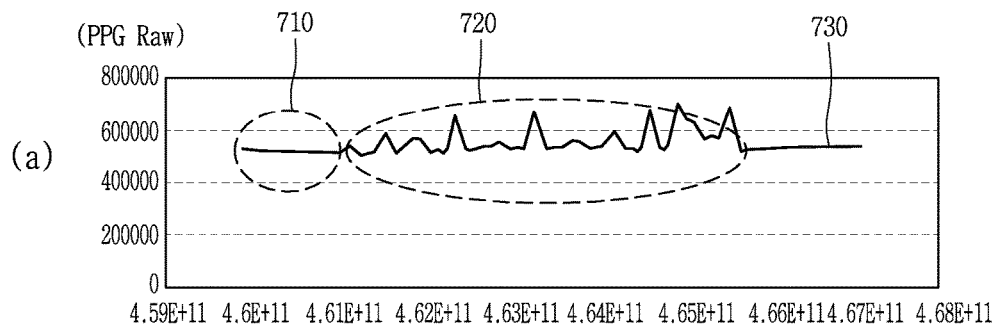
Figure 7B:
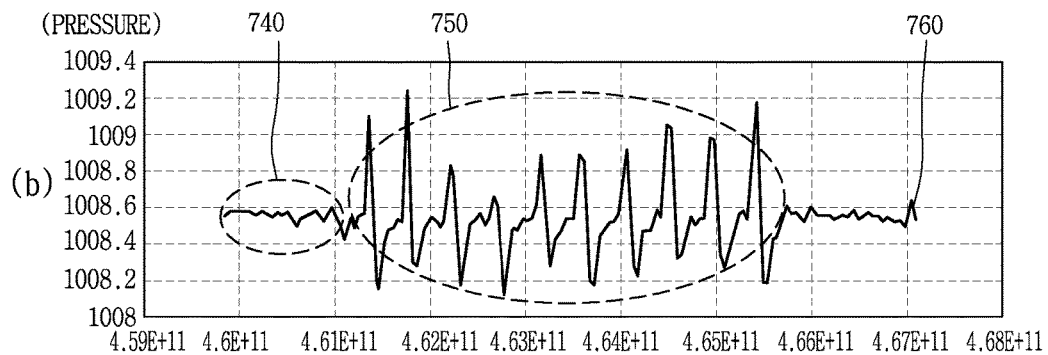
Figure 7B:
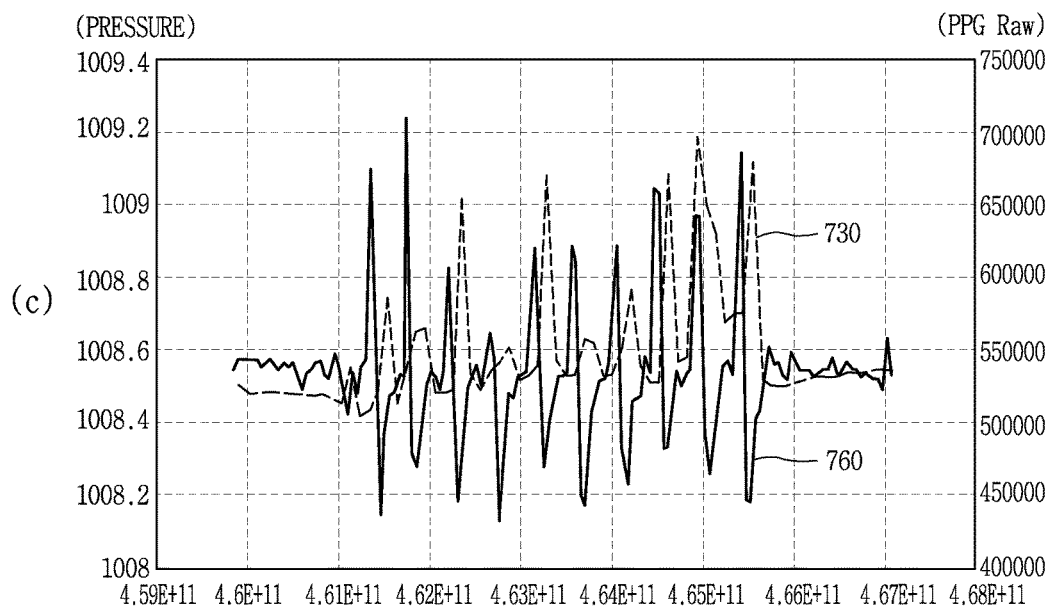

FIGS. 7A and 7B are views illustrating a PPG sensor provided in a watch type mobile terminal in accordance with the present invention.

Referring to FIG. 7A, the watch type mobile terminal according to the present invention may include a PPG sensor 700 disposed on the rear cover 301c.

The PPG sensor 700 is a sensor using a principle that degrees of light absorption and light reflection vary according to the change in a blood volume resulting from a heart beat. The PPG sensor 700 includes a light emitting diode (not illustrated) emitting infrared light, and a photodiode (not illustrated) of detecting light which was emitted from the light emitting diode to a user's body and then reflected from the user's body. The PPG sensor 700 may measure a heart rate using such reflected light.

The PPG sensor 700 may be located at an area coming in contact with the user's wrist to detect whether or not the watch type mobile terminal 300 has been worn. To this end, the PPG sensor 700 may always operate in a power-on state.

Meanwhile, the PPG sensor 700 may also detect a motion of the watch type mobile terminal 300 as well as the worn state of the watch type mobile terminal 300.

(a) of FIG. 7B is a graph 730 showing measurement values obtained by the PPG sensor 700. Referring to the graph 730, different values may be measured by the PPG sensor 700, respectively, when the main body 301 is stopped (710) and when the main body 301 moves (720).

In more detail, as shown in the area 710 on the graph 730 of (a) of FIG. 7B, when the main body 301 does not move, the measurement value measured by the PPG sensor 700 rarely varies. On the other hand, as illustrated in the area 720 on the graph 730 of (a) of FIG. 7B, when the main body 301 moves, the variation of the measurement value can be detected.

Therefore, the motion of the main body 301 can be detected through the PPG sensor 700.

Meanwhile, the variation of the measurement value obtained by the PPG sensor 700 may be in proportion to the variation of pressure obtained by the pressure sensor according to the motion of the main body 301. In more detail, constant pressure is detected by the pressure sensor when the main body does not move, but the pressure variation may be measured when the main body moves. For example, as shown in a graph 760 of (b) of FIG. 7B, when the main body does not move, the pressure sensor may measure constant pressure as shown in an area 740. On the other hand, when the main body moves, the pressure sensor may detect the pressure variation as shown in an area 750.

Meanwhile, as illustrated in (c) of FIG. 7B, comparing the two graphs 730 and 760 with each other, it can be observed that an amount of light detected by the PPG sensor and the variation of the pressure detected by the pressure sensor according to the motion of the main body are proportional to each other. That is, it can be noticed that the graph showing the light amount of the PPG sensor and the graph showing the pressure variation of the pressure sensor vary in the same pattern although having a delay for a predetermined time in the graph showing the light amount of the PPG sensor.

Therefore, the present invention can detect the motion of the main body using the PPG sensor which is configured to always operate, and compensate for a varied value upon measuring the pressure according to the motion of the main body.

So far, the PPG sensor of the watch type mobile terminal according to the present invention has been described.

Hereinafter, description will be given of a method of improving measurement accuracy of the pressure sensor of the watch type mobile terminal according to the present invention.

Figure 8A:
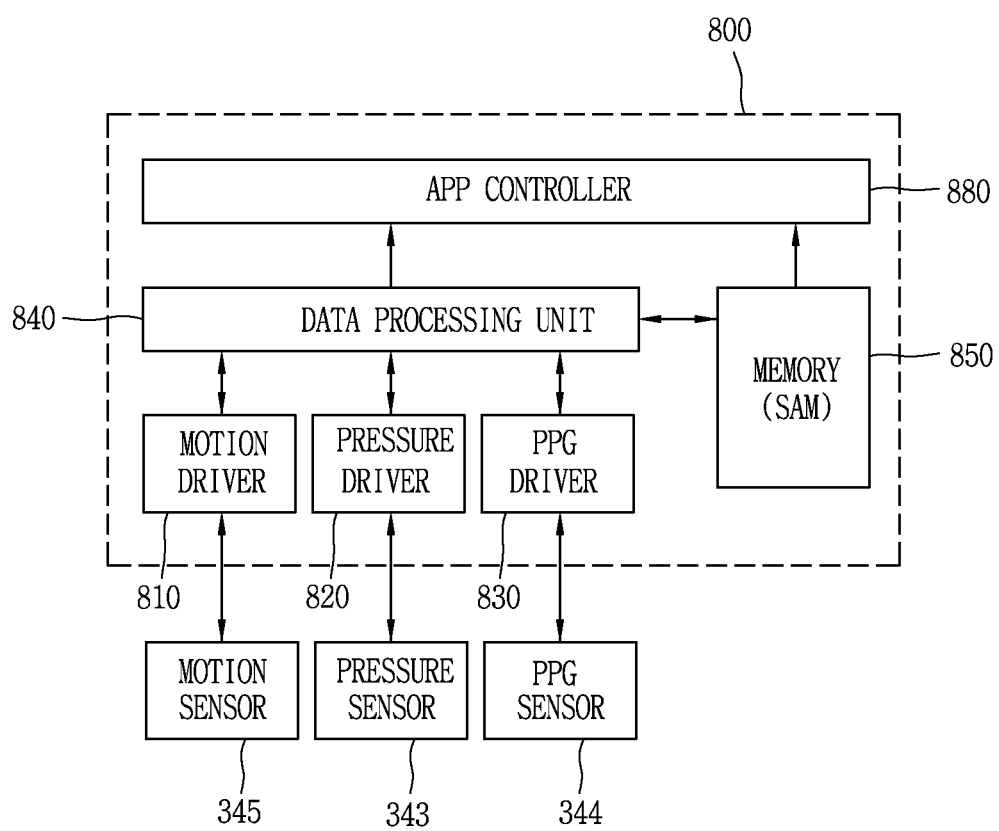
FIG. 8A is a structural view illustrating a structure of an application installed on a watch type mobile terminal in accordance with the present invention.
Figure 8B:
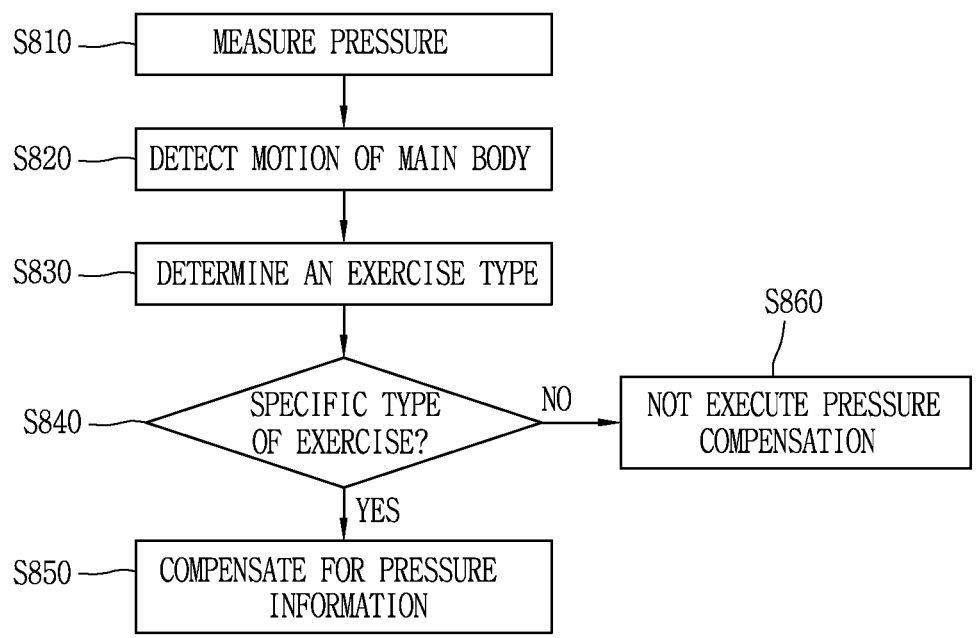
FIG. 8B is a flowchart illustrating a method of measuring pressure using a pressure sensor on an application in a watch type mobile terminal in accordance with the present invention.

FIG. 8A is a structural view illustrating a structure of an application installed on the watch type mobile terminal in accordance with the present invention, and FIG. 8B is a flowchart illustrating a method of measuring pressure through the pressure sensor on the application in the watch type mobile terminal in accordance with the present invention.

Figure 9:
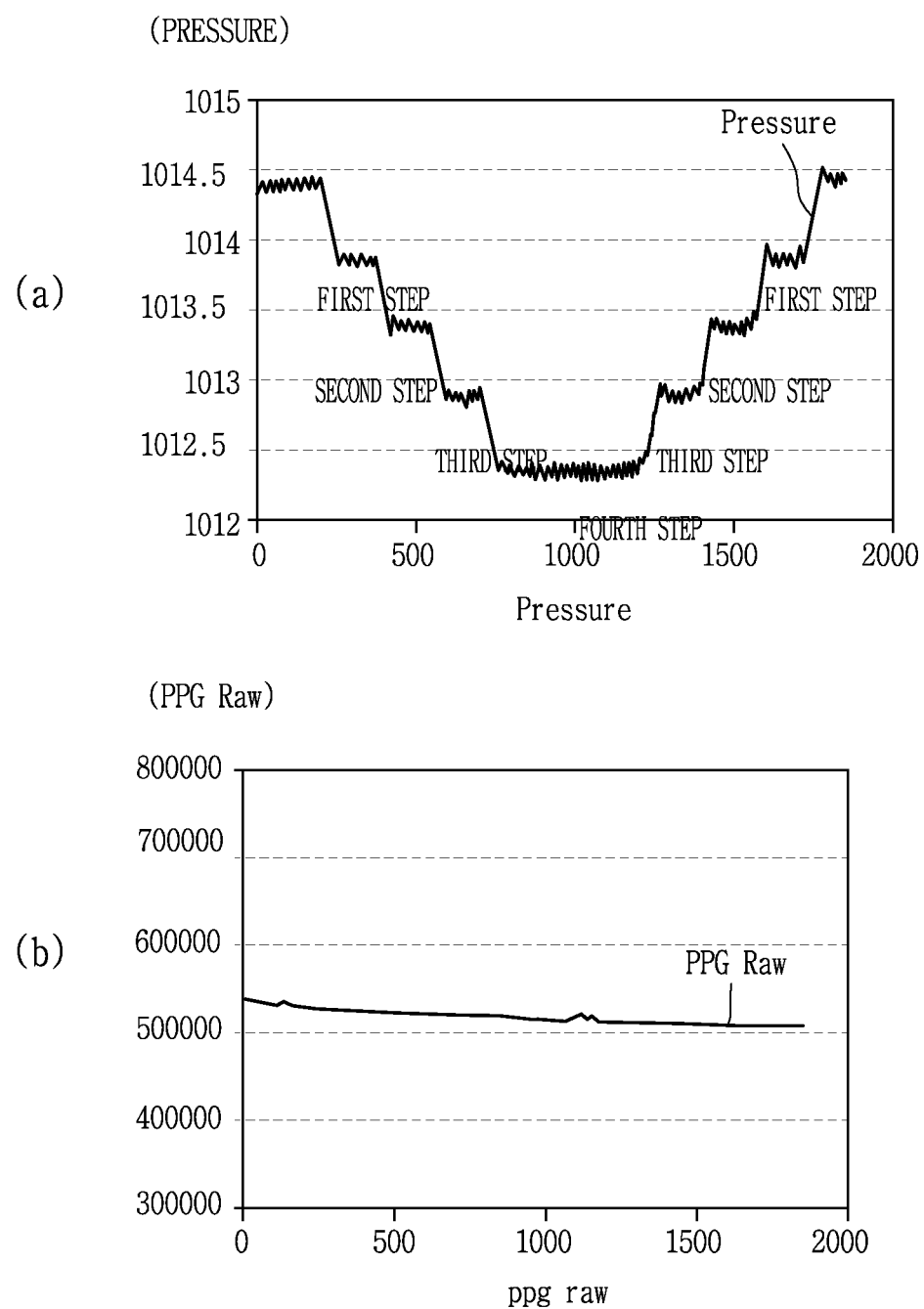
FIGS. 9 and 10 are graphs showing measurement values obtained by a pressure sensor and a PPG sensor according to a motion of a watch type mobile terminal.
Figure 10:
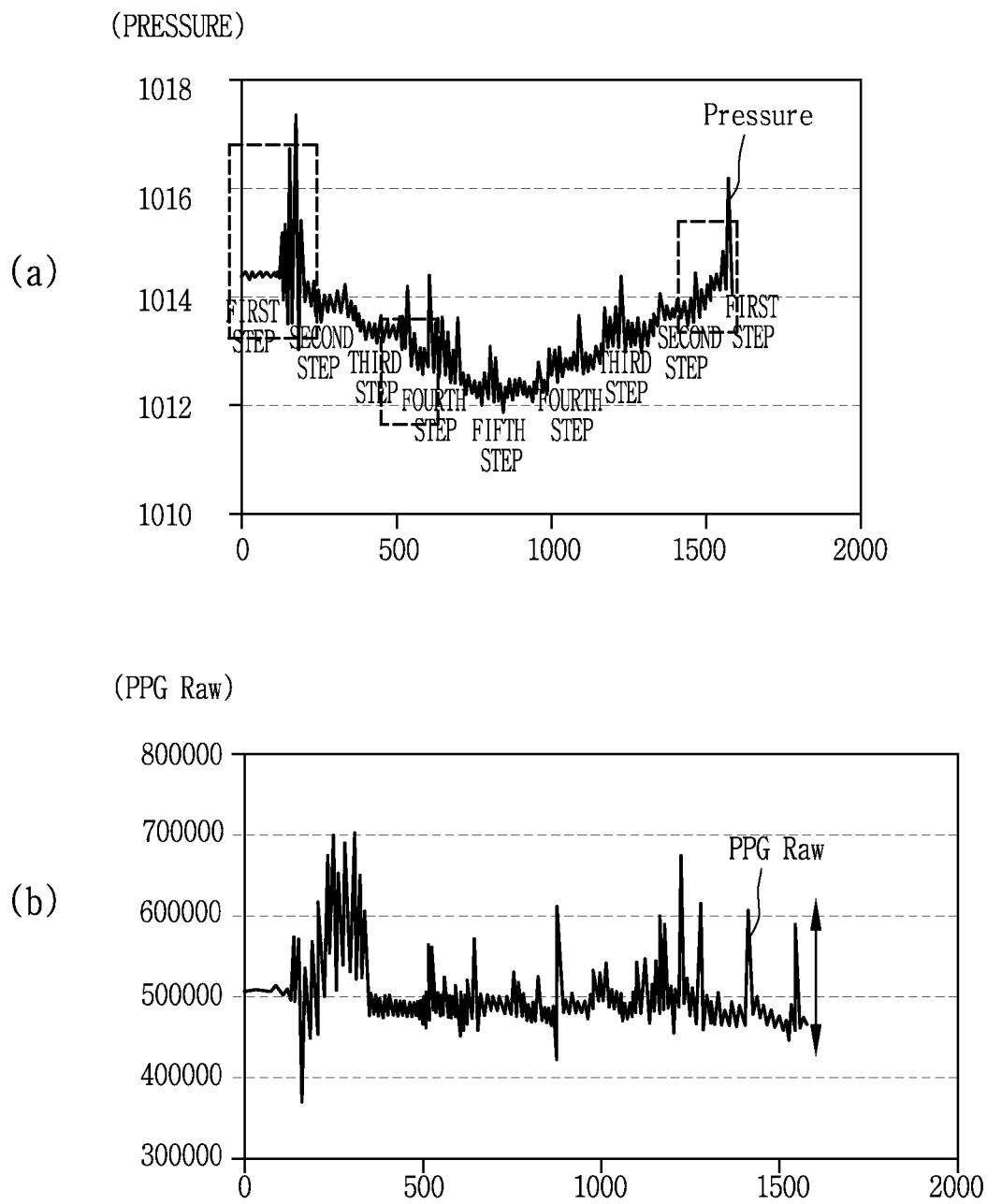

FIGS. 9 and 10 are graphs showing variations of measurement values obtained by the pressure sensor and the PPG sensor according to the motion of the watch type mobile terminal.

The watch type mobile terminal according to the present invention may determine a number of walking up and down stairs, a currently-located step of the stairs and the like, through an application 800 (see FIG. 8). The application 800 refers to an application program executable on the watch type mobile terminal.

The watch type mobile terminal may have an application installed thereon to provide a function associated with pressure measurement. The application 800 may be provided by an application provider or a manufacturer of a mobile terminal.

The application 800 may also be installed on the mobile terminal by a user selection, or installed as a default program upon shipping the mobile terminal in a factory.

The user may install the application 800 by downloading it through a server (e.g., Google play, etc.) providing applications or install the application 800 using an installation file stored in the memory of the mobile terminal upon shipping the mobile terminal in the factory.

As such, the application 800 providing the function associated with the pressure measurement may also be referred to as a health application, and this term may be easily changed by a person skilled in the art.

The application 800 may include a motion driver 810, a pressure driver 820, a PPG driver 830, a data processing unit 840, a memory 850, and an App controller 880.

The motion driver 810 may serve to receive measurement values obtained by a motion sensor 345. The pressure driver 820 may serve to receive pressure values measured by the pressure sensor 343. The PPG driver 830 may serve to receive PPG values measured by the PPG sensor.

Those drivers 810, 820 and 830 may perform conversions of data measured by each sensor such that the App controller 880 of the application can read, write and control such data.

Also, the data processing unit 840 may serve to transfer the data received from those drivers 810, 820 and 830 to the App controller 880 and the memory 850. The data processing unit 840 may include a data distribution frame (DDF) and an SMGR.

The memory 850 may store the processed data received from the data processing unit 840 and data required for an operation of the application. For example, the memory 850 may store AMD-associated data, CMC-associated data, data processed by the data processing unit 840, and filter data for compensating for pressure.

An example of the memory 850 may be a sequential access memory (SAM).

The App controller 880 may compensate for the pressure measurement values by controlling the drivers 810, 820 and 830, the data processing unit 840 and the memory 850, or determine a user's current altitude (height) using the pressure measurement values.

The foregoing description has been given of a software structure of the application for measuring pressure in the watch type mobile terminal according to the present invention.

Hereinafter, a method of measuring pressure using the application will be described in more detail. The following description will be given of pressure measurement using the application, but the present invention may not be limited to this. The description to be provided will also be equally applied to a case where the controller of the watch type mobile terminal directly executes the pressure measurement.

Referring to FIG. 8B, the controller 180 of the watch type mobile terminal may measure external pressure through the pressure sensor 343 (S810).

The user may execute the application 800 by selecting an icon of the application 800 installed on the mobile terminal. The application 800 may be an application associated with the pressure measuring function.

When the application is executed, the App controller 880 may receive the external pressure measured by the pressure sensor 343 through the pressure driver 820, on the basis of a user request or a satisfaction of a preset condition. Here, the external side refers to a space surrounding the watch type mobile terminal.

The preset condition may be a condition associated with at least one of time, place and motion. For example, the preset condition may be a condition of one-hour period. As another example, the preset condition may be a condition that the watch type mobile terminal 300 is located within a building (i.e., indoor). As another example, the preset condition may be a condition that the motion (movement) of the watch type mobile terminal 300 is detected.

The App controller 880 may detect the motion of the main body through the motion sensor as well as measuring the pressure through the pressure sensor 343 (S820).

The App controller 880 may measure the pressure and the motion in a simultaneous or sequential manner, and unlike the example of FIG. 8B, the measurement orders may be switched with each other.

The App controller 880 may receive information related to motions measured by the motion sensor through the motion driver 810.

The App controller 880 may determine whether or not the watch type mobile terminal is moved, according to the motion information measured by the motion sensor, on the basis of a preset algorithm. The motion information may include acceleration information (or acceleration value), rotation information and the like.

The preset algorithm may be an absolute motion detection (AMD) algorithm. The AMD algorithm is an algorithm of determining whether the watch type mobile terminal 300 is currently in a moving state or in a non-moving state, using the acceleration value measured through the motion sensor.

For example, when the acceleration value measured by the motion sensor is more than a predetermined value, the App controller 880 may determine that the watch type mobile terminal 300 is in the moving state. On the other hand, when the acceleration value is smaller than the predetermined value, the App controller 880 may determine that the watch type mobile terminal 300 is in the non-moving state.

Meanwhile, when it is determined through the AMC algorithm that the watch type mobile terminal 300 is in the non-moving state, the App controller 880 may deactivate the pressure sensor. The deactivation of the pressure sensor may be an operation of turning off the pressure sensor.

When it is determined through the AMC algorithm that the watch type mobile terminal 300 is in the moving state, the App controller 880 may activate the pressure sensor. The activation of the pressure sensor may be an operation of turning on the pressure sensor. Therefore, the present invention can more reduce power waste than that in the always-on state of the pressure sensor.

When it is determined that the watch type mobile terminal 300 is in the moving state, the App controller 880 may determine an exercise type of the watch type mobile terminal 300 (S830).

When the moving state is determined through the AMD algorithm, the App controller 880 may determine the exercise type using a coarse motion classification (CMC) algorithm.

The CMC algorithm is an algorithm for determining an exercise type according to a motion using patterns of data measured by the motion sensor. In this instance, the data pattern according to each exercise type may be prestored.

That is, the App controller 880 may compare the data patterns measured by the motion sensor with prestored patterns, and determine the exercise type according to the comparison result.

The exercise type refers to a type of motion. In more detail, the exercise type may include walking, running, vehicle-driving, bicycle-riding and the like. The vehicle-driving is an exercise that the watch type mobile terminal 300 is located in a moving vehicle and thus has the same motion as the moving vehicle. Similar to this, the bicycle-riding is an exercise that the watch type mobile terminal 300 moves along with a moving bicycle.

The App controller 880 may determine whether or not the determined exercise type corresponds to a specific type (S840).

When the determined exercise type corresponds to the specific type, the App controller 880 may execute an error compensation for the pressure measured by the pressure sensor (S850). On the other hand, when the determined exercise type does not correspond to the specific type, the App controller 880 may not execute the error compensation for the pressure measured by the pressure sensor (S860).

The specific type may be walking or running associated with a stair climbing exercise. The bicycle-riding or vehicle-driving is not related to the stair climbing exercise and thus the error compensation of the pressure sensor is not required. Therefore, the App controller 880 may not exercise the error compensation.

The specific type may be a walking or running exercise associated with a stair climbing exercise. The bicycle-riding or the vehicle-driving has no relation to the stair climbing exercise, and thus the App controller 880 may not execute the error compensation because of no necessity of the error compensation of the pressure sensor.

When the specific type is determined as walking or running, the App controller 880 may determine whether or not the exercise is the stair climbing exercise. The stair climbing exercise refers to an exercise of walking or running up and down stairs.

In more detail, after the exercise is determined as the walking or running exercise, when a difference between at least two pressure values each measured by a predetermined time interval is more than a predetermined value, the App controller 880 may determine it as the stair climbing exercise.

For example, when a difference between two pressure each measured by a predetermined time interval is more than 0.3 hpa, the App controller 880 may determine it as the stair climbing exercise.

When the exercise is determined as the stair climbing exercise, the App controller 880 may compensate for the pressure measured by the pressure sensor. For the stair climbing exercise, as aforementioned in FIG. 4, the reduction of the pressure measurement accuracy due to the motion of the watch type mobile terminal is caused.

FIG. 9 is a graph showing variation of pressure values when the user moves without a movement within an elevator. As illustrated in (a) of FIG. 9, when the watch type mobile terminal 300 is free from the user's motion, it can be noticed that the pressure sensor 343 measures pressure with a relatively accurate numerical value. In this instance, as illustrated in (b) of FIG. 9, it can also be noticed that the measurement values by the PPG sensor are obtained without a variation within a predetermined range.

However, as illustrated in (a) of FIG. 10, when the user walks up or down stairs, it can be noticed that the pressure values measured by the pressure sensor 343 greatly vary. Also, as illustrated in (b) of FIG. 10, it can be noticed that the measured values by the PPG sensor vary in a similar pattern to those of the pressure sensor.

Therefore, the App controller 880, as illustrated in FIGS. 7A and 7B, can compensate for the pressure measured by the pressure sensor using the measurement values of the PPG sensor that vary in the similar pattern to the pressure variation.

Meanwhile, when it is determined based on the measurement values obtained by the motion sensor that the watch type mobile terminal does not move any more, the App controller 880 may not execute the compensation for the pressure value any more.

Figure 11:
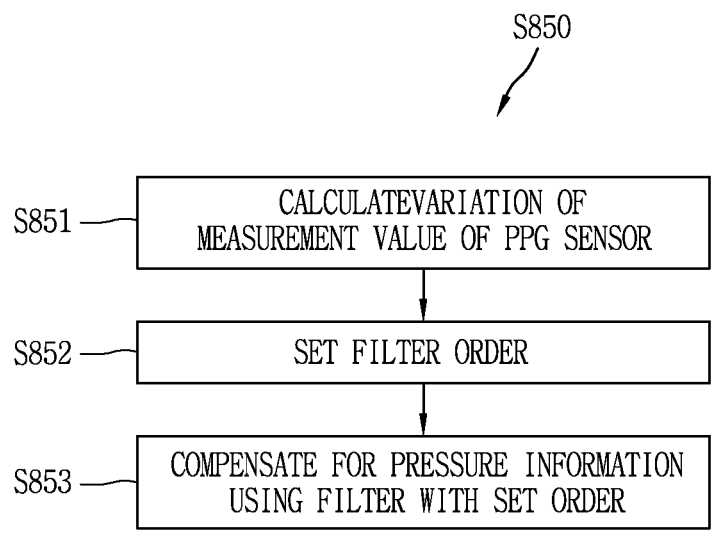
FIGS. 11 to 13 are conceptual views illustrating a method for compensating for a measurement error in a watch type mobile terminal in accordance with the present invention.

That is, the App controller 880 may not apply a filter which is applied to the pressure value any more. Also, when it is determined that any motion is not detected, the App controller 880 may deactivate the pressure sensor. This may result in preventing unnecessary power consumption Hereinafter, the compensating method will be described in more detail with reference to the accompanying drawings. FIGS. 11 to 13 are conceptual views illustrating a method for compensating for a measurement error in a watch type mobile terminal in accordance with the present invention.

The App controller 880 may use the measurement values of the PPG sensor for the pressure compensation. In more detail, the App controller 880 may estimate a pressure variation based on the variation of the measurement value of the PPG sensor, set an appropriate filter order according to a current pressure variation, and execute the pressure compensation using the filter. Therefore, the App controller 880 may compensate for the pressure using the appropriate filter according to the pressure variation, thereby improving the pressure measurement accuracy. As such, the method of executing the pressure compensation by setting the appropriate filter order according to the pressure variation may be referred to as an adaptive filter compensation method.

Hereinafter, a method of setting a filter order will be described.

Referring to FIG. 11, the App controller 880 may calculate a variation of measurement values of the PPG sensor for pressure compensation (S851). Afterwards, the App controller 880 may set an order of a filter for the pressure compensation based on the variation of the measurement values of the PPG sensor (S852).

The filter refers to a low pass filter implemented in a software configuration. When the filter order increases, accuracy of error compensation is improved but a time delay extends.

Figure 12A:
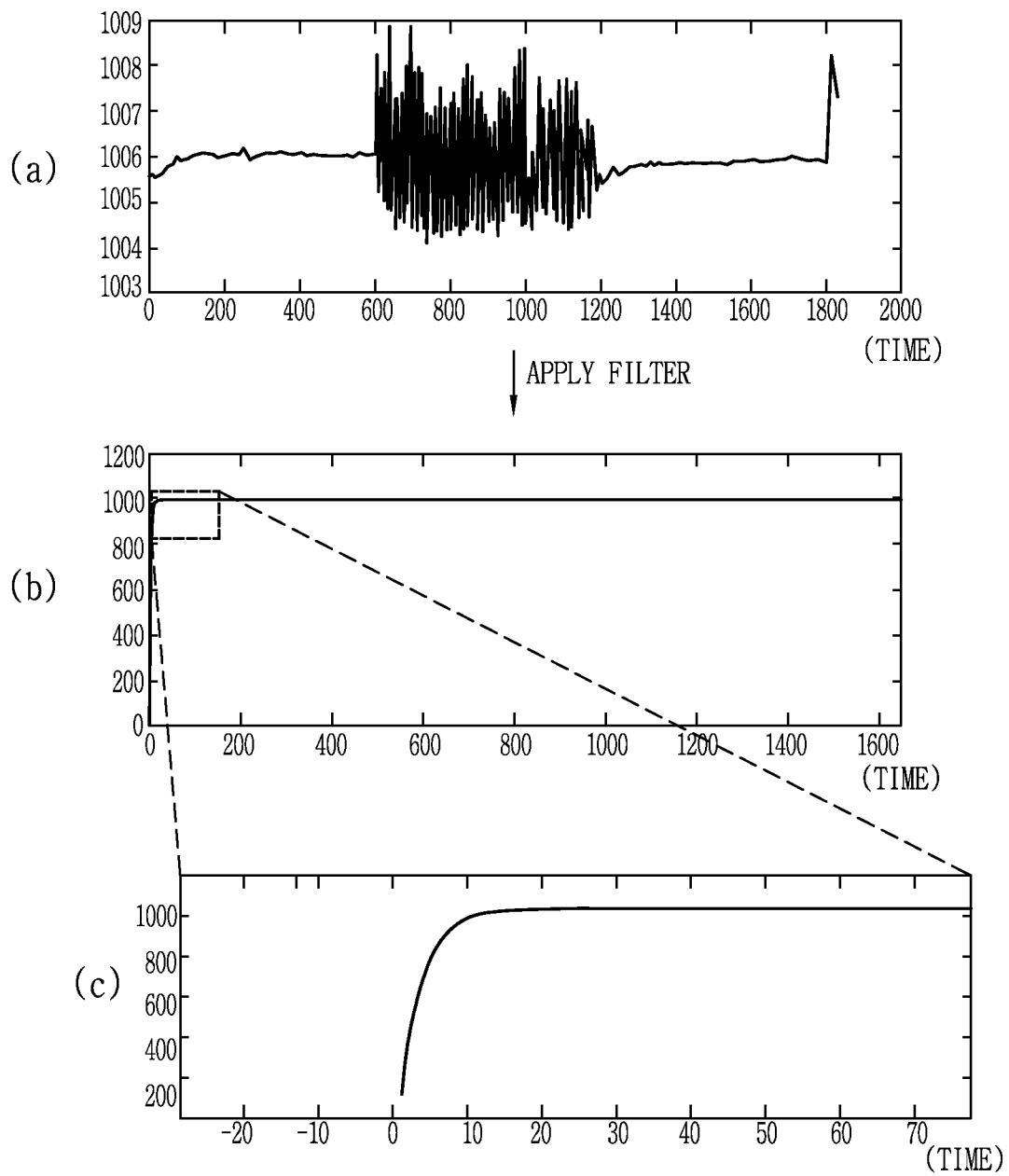
Figure 13:
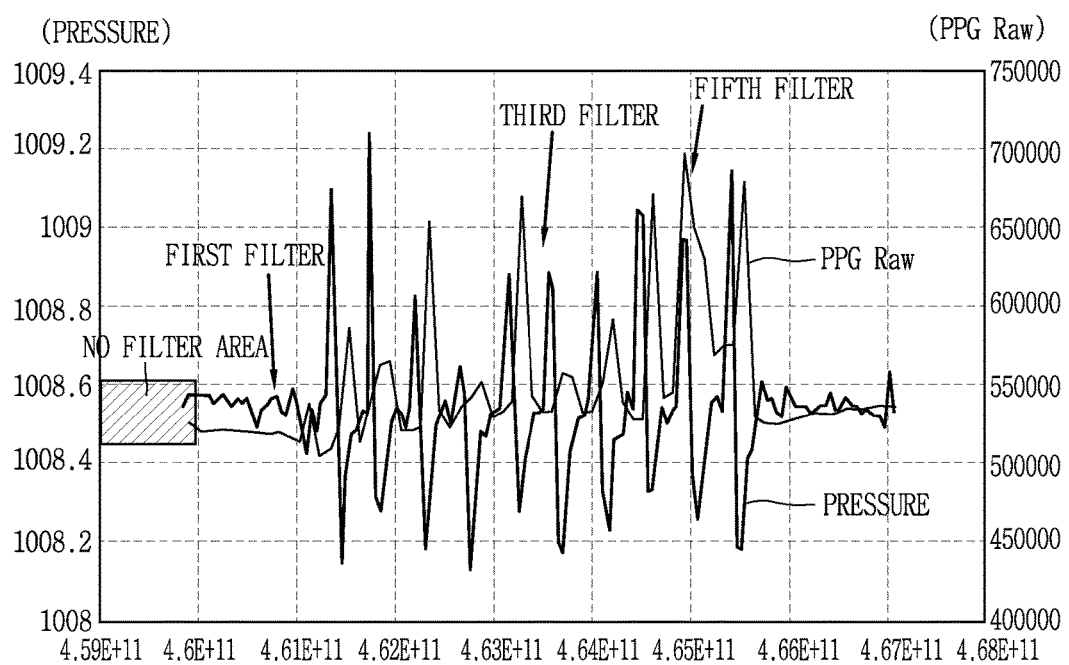

In more detail, FIG. 12A is a graph showing results of the pressure compensation using a first (primary) filter. (a) of FIG. 12A is a graph showing the pressure values, and (b) of FIG. 12A is a graph showing compensated pressure values using the first filter. As shown in (b) of FIG. 12A, it can be seen that the variation of the pressure values almost disappears.

Also, referring to (c) of FIG. 12A showing one enlarged portion of (b) of FIG. 12A, it can be noticed that a time delay is rarely caused.

Figure 12B:
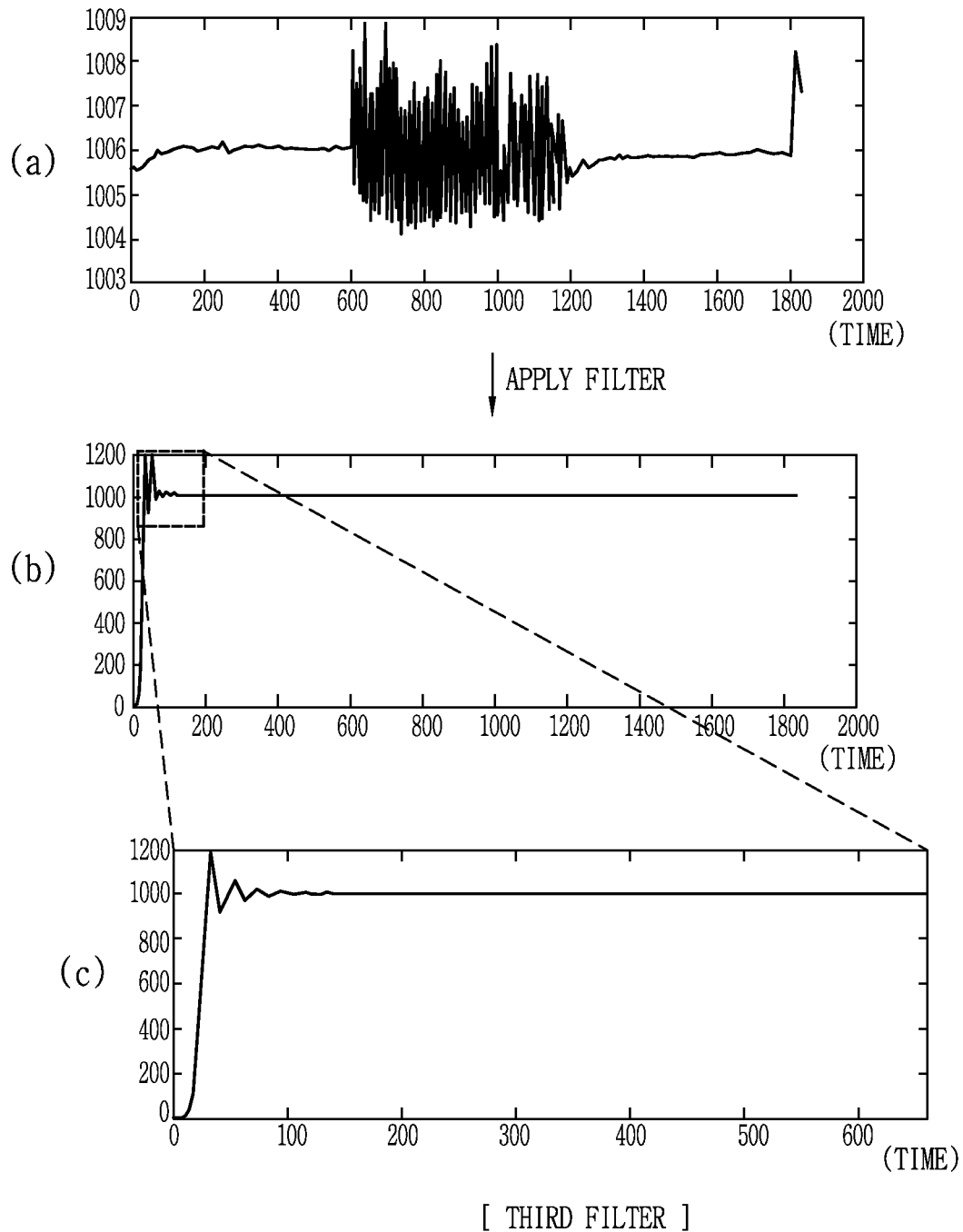

Next, FIG. 12B is a graph showing results of the pressure compensation using a third (tertiary) filter. (a) of FIG. 12B is the same graph as that of (a) of FIG. 12A, and (b) of FIG. 12B is a graph showing compensated pressure values using the third filter. (c) of FIG. 12B is a graph showing an enlarged portion of (b) of FIG. 12B. Referring to (c) of FIG. 12B, it can be seen that a time delay has occurred, compared with (c) of FIG. 12A.

Figure 12C:
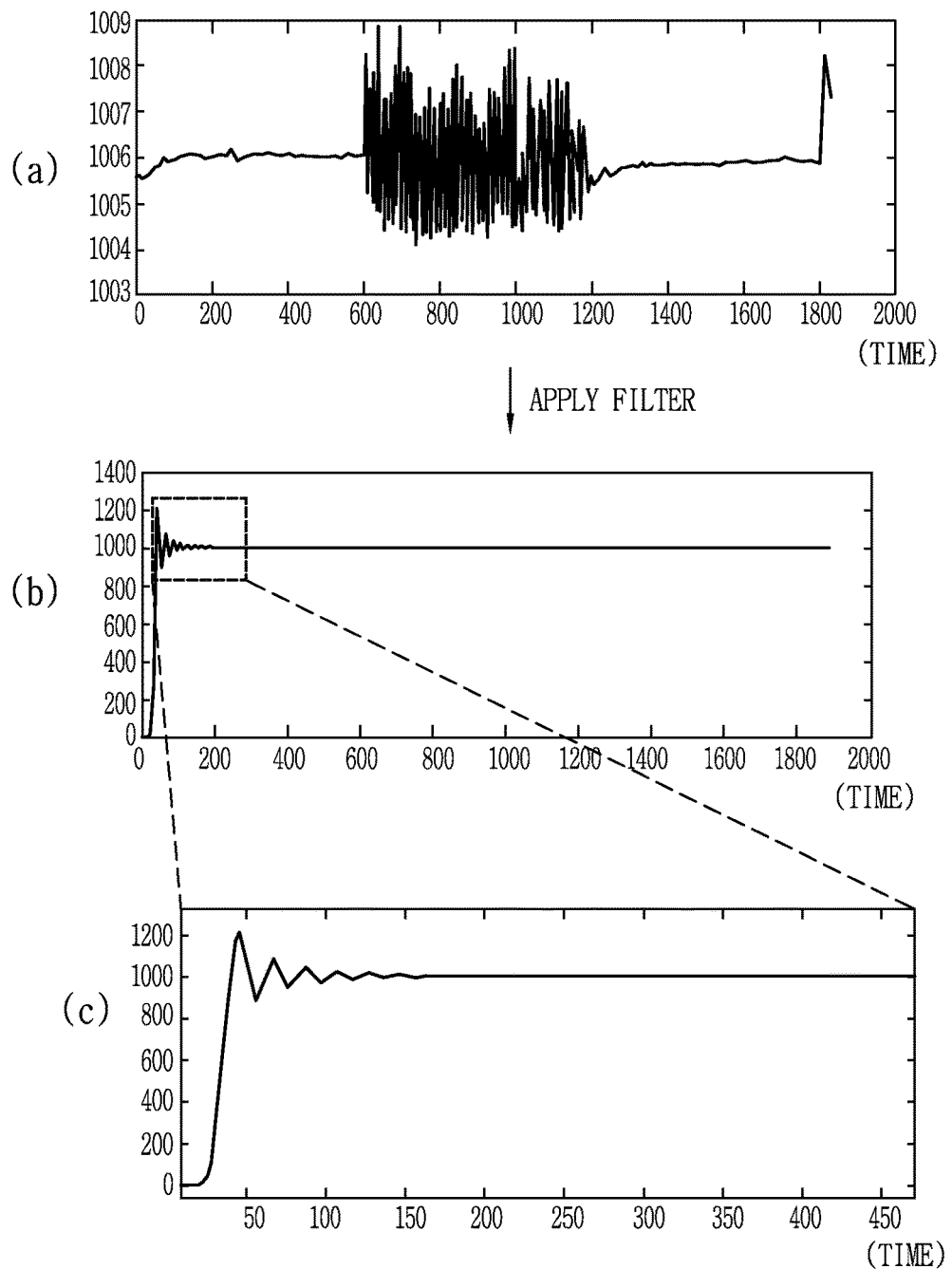

Next, FIG. 12C is a graph showing results of the pressure compensation using a fifth (quintic) filter. (a) of FIG. 12C is the same graph as that of (a) of FIG. 12A, and (b) of FIG. 12C is a graph showing compensated pressure values using the fifth filter. (c) of FIG. 12C is a graph showing an enlarged portion of (b) of FIG. 12C. Referring to (c) of FIG. 12C, it can be seen that a time delay has occurred, compared with (c) of FIG. 12B.

That is, it can be noticed that the accuracy is improved but the time delay occurs when the filter order raises up.

When a great variation of the measurement values of the PPG sensor is detected, the App controller 880 may set a high order of a filter for the pressure compensation. That is, when the great variation of the measurement values of the PPG sensor is detected, it may be determined that the variation of the pressure values is also great. Accordingly, the filter order for improving the accuracy may be set as a high order.

Also, when a small variation of the measurement values of the PPG sensor is detected, the filter order for the pressure compensation may be set as a low order. That is, when the small variation of the measurement values of the PPG sensor is detected, it may be determined that the variation of the pressure values is also small. Therefore, the filter order may be set as a low order to reduce the time delay due to the filter while maintaining the accuracy.

The App controller 880 may compensate for the pressure using the filter with the set order (S853). The App controller 880 may compensate for the pressure values measured by the pressure sensor using the filter with the set order.

Also, during the pressure measurement, the App controller 880 may change the filter order by using the measurement values of the PPG sensor in real time.

That is, as illustrated in FIG. 13, the App controller 880 may change the order of the filter in the order of the first, third and fifth filters according to the variation of the measurement values of the PPG sensor. Therefore, the present invention can improve the measurement accuracy of the pressure sensor and simultaneously reduce the time delay by using a filter with an appropriate order.

As discussed above, in a watch type mobile terminal according to the present invention, a pressure sensor can directly detect external air, which may result in improving accuracy of pressure measurement.

Also, in the watch type mobile terminal according to the present invention, the measurement accuracy of the pressure sensor can be improved by using an adaptive filter.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A watch type mobile terminal capable of making pressure measurements, the terminal comprising:
    a main body;
    a motion sensor configured to detect motion of the main body;
    a photoplethymography (PPG) sensor disposed on a rear side of the main body and configured to detect a heart rate;
    a pressure sensor configured to detect pressure of external air; and
    a controller configured to:
    decide an order of a low pass filter for compensating for the pressure based on variation of a measurement value obtained by the PPG sensor;
    compensate for a pressure detected by the pressure sensor using the low pass filter having the decided order, when the motion of the main body is detected by the motion sensor.

2. The terminal of claim 1, wherein the controller is further configured to:
    determine an exercise type based on motion information detected by the motion sensor, and
    compensate for the pressure based according to the measurement value obtained by the PPG sensor and the determined exercise type when the exercise type is a specific type.

3. The terminal of claim 2, wherein the controller is further configured to:
    not compensate for the pressure when the determined exercise type is not the specific type.

4. The terminal of claim 2, wherein the exercise type includes any one of a walking exercise, a running exercise, a bicycling exercise, or a vehicle-driving exercise.

5. The terminal of claim 1, wherein the controller is further configured to:
    set a high order for the low pass filter for compensating for the pressure when the variation of the measurement value obtained by the PPG sensor meets a first threshold value; and
    set a low order for the low pass filter for compensating for the pressure when the variation of the measurement value obtained by the PPG sensor meets a second threshold value that is smaller than the first threshold value.

6. The terminal of claim 1, wherein the PPG sensor is located at a rear side of the main body and operates regardless of user setting.

7. The terminal of claim 1, wherein the controller is further configured to:
    deactivate the pressure sensor when the motion is not detected according to motion information provided by the motion sensor; and
    activate the pressure sensor when the motion is detected according to the motion information.

8. The terminal of claim 1, wherein the controller is further configured to:
    do not compensate for the pressure value when it is determined that the motion of the main body is not occurring.

9. The terminal of claim 8, wherein the controller is further configured to:
    do not apply a low pass filter to the pressure value.

* * * * *